(12) United States Patent
You et al.

(10) Patent No.: US 10,325,286 B1
(45) Date of Patent: *Jun. 18, 2019

(54) MESSAGE TRANSMISSION METHOD

(71) Applicant: CHUNGHWA TELECOM CO., LTD., Taoyuan (TW)

(72) Inventors: Jia-Ming You, Taoyuan (TW); Shih-Cheng Yang, Taoyuan (TW); Cheng-Yang Chen, Taoyuan (TW)

(73) Assignee: CHUNGHWA TELECOM CO., LTD., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,760

(22) Filed: Mar. 6, 2018

(30) Foreign Application Priority Data

Jan. 9, 2018 (TW) .............................. 107100761 A (51) Int. Cl.
*H04W 4/06* (2009.01)
*G06Q 30/02* (2012.01)
*H04W 4/12* (2009.01)

(52) U.S. Cl.
CPC .......... *G06Q 30/0267* (2013.01); *H04W 4/12* (2013.01)

(58) Field of Classification Search
CPC ....... H04W 84/12; H04W 24/02; H04W 4/04; H04W 48/20; H04W 88/02; H04W 76/10; H04W 4/80; H04W 72/042; H04W 72/06; H04W 84/005; H04W 64/00; H04W 4/029; H04W 4/60; H04W 52/245; H04W 40/244; H04W 80/00; H04W 8/245; H04W 4/021; H04W 76/14; H04W 80/04; H04W 88/10; H04W 4/21; H04L 63/08; H04L 63/0272; H04L 12/4641; H04L 29/08657; H04L 61/2007; H04L 47/14; H04L 51/38; H04L 67/322; H04L 1/0041; H04L 1/0071; H04L 1/0057; H04L 1/006; H04L 1/0083; H04L 1/009; H04L 2001/0093; H04L 67/12;
(Continued)

(56) References Cited

U.S. PATENT DOCUMENTS

3,820,644 A * 6/1974 Yeh .............................. B41J 3/01
101/93.04
4,079,482 A * 3/1978 Yeh .......................... G06K 1/20
235/487
(Continued)

*Primary Examiner* — Nimesh Patel
(74) *Attorney, Agent, or Firm* — Amin, Turocy & Watson LLP (57) ABSTRACT

The present invention discloses a message transmission method. A first portable device transmits an identity information of a first wireless signal transmitter and a message content to a cloud server. The cloud server analyzes the message content to obtain a message tag of the message content, and obtain a wireless signal transmitter tag of the first wireless signal transmitter according to the identity information. The cloud server then obtains at least one target identity information representing at least one target wireless signal transmitter by using the message tag and the wireless signal transmitter tag, to obtain an association between the message content and the at least one target identity information. When receiving a second identity information, a second portable device compares the second identity information with the at least one target identity information and receives the message content from the cloud server.

10 Claims, 6 Drawing Sheets

(58) Field of Classification Search
CPC ..... H04L 1/0065; H04L 67/306; H04L 67/04; H04L 47/2408; H04L 29/12028; H04L 63/0428; H04L 12/2809; H04L 67/18; H04L 41/12; H04L 67/02; H04L 67/34; H04L 29/12273; H04L 29/12301; H04L 41/0253; H04L 2209/80; H04L 41/0681; H04L 41/0803; H04L 63/0245; H04L 63/1408; H04L 69/08; H04L 29/06; H04L 63/101; H04L 63/1466; H04L 2012/2841; H04N 21/23614; H04N 21/4348; H04N 21/235; H04N 21/44222; H04N 21/4532; H04N 19/68; H04N 21/4346; H04N 21/845; G06K 9/00221; G06K 9/00993; G06K 9/0061; G06K 9/00617; G06K 7/10297; G06K 7/1095; G06K 9/00288; G06K 19/06; G06F 16/951; G06F 11/0709; G06F 11/3409; G06F 16/41; G06F 1/1613; G06Q 50/01; G06Q 50/265; G06Q 10/107; G06Q 10/00; G06Q 10/0639; G06Q 10/06; G06Q 20/32; G06Q 30/0621; G06Q 30/0643; G06Q 10/10

See application file for complete search history.

(56) References Cited

U.S. PATENT DOCUMENTS

| | | | | |
|---|---|---|---|---|
| 9,813,853 | B2* | 11/2017 | Yang | H04W 40/244 |
| 2007/0230432 | A1* | 10/2007 | Choi | H04W 88/04 370/347 |
| 2008/0082424 | A1* | 4/2008 | Walton | G06Q 10/047 705/26.1 |
| 2015/0348004 | A1* | 12/2015 | Eramian | G06Q 20/3224 705/40 |
| 2015/0350910 | A1* | 12/2015 | Eramian | H04W 12/08 726/6 |
| 2016/0044583 | A1* | 2/2016 | Bahram Pour | H04W 4/02 455/456.3 |
| 2016/0050530 | A1* | 2/2016 | Corbalis | H04W 4/029 455/456.1 |
| 2016/0094946 | A1* | 3/2016 | Keithley | H04W 4/023 455/456.3 |
| 2016/0112838 | A1* | 4/2016 | Kaushik | H04W 4/023 455/456.3 |
| 2017/0220129 | A1* | 8/2017 | Wu | G06F 3/0237 |
| 2017/0270324 | A1* | 9/2017 | Younger | G06K 7/10297 |

* cited by examiner

MESSAGE TRANSMISSION METHOD

BACKGROUND

1. Technical Field

The present invention relates to message delivering techniques, and, more particularly, to a message transmission method that employs wireless signal transmitters to assist in message delivery.

2. Description of Related Art

With the development of technology, mobile communications are used in our daily lives, for example, to obtain various services using a mobile device. Network-based services have created a myriad of possibilities. With the widespread and increasing growth of mobile phones, if advertisements and promotions can be incorporated therein, they will bring additional revenues for vendors.

These network-based services, or "mobile advertising and information services," essentially involve the use of a user's mobile phone to obtain information related to the location of the user in order to provide appropriate services. These services have had major technological breakthroughs in recent years. However, the location suitability and timing of the information or services need to be considered. Location suitability and timing can be determined and controlled based on geographical locations and time. In general, a wireless signal transmitter at a service-providing location can be used to transmit relevant information. However, one drawback is found that the wireless signal transmitter requires wireless network capability, resulting in high setup cost. In addition, this type of service sends information only to consumers in that area without considering other consumers that might be or are about to enter the area. For example, consumer A is in region M, and service X is provided. There is another consumer B in region N, wherein region N is only two minutes away from region M. Consumer B is likely to be interested to know more about service X. It would be more beneficial for businesses if service information can be appropriately provided to potential consumers.

At present, beacons are used for message delivery. Essentially, beacons carry messages that are pushed to nearby users (e.g., consumers). However, this requires the binding of a preset message with a beacon. Moreover, the existing method of pushing an advertisement through beacons is unconditional, meaning any user passing by a store will get the message. There lacks a way to control the time and the range of a beacon based on the content of the message.

Therefore, there is a need for a message transmission technology that widens the range of proximity- and time-based services by delivering them to potential customers outside a particular area.

SUMMARY OF THE INVENTION

An objective of the present invention is to provide a message transmission method that employs wireless signal transmitters to assist in electronic message delivery. By analyzing the tags of wireless signal transmitters and a message, dynamic real-time calculations can be made to decide to which wireless signal transmitters the message is to be delivered.

In addition, another objective of the present invention is to determine portable devices in which ranges are to receive the message by using the signal coverage of the wireless signal transmitters to.

The present invention provides a message transmission method, which may include: a first portable device transmitting an identity information of a first wireless signal transmitter and a message content of the first portable device to a cloud server; the cloud server analyzing the message content to obtain a message tag of the message content and obtain a wireless signal transmitter tag of the first wireless signal transmitter based on the identity information; the cloud server analyzing the message tag and the wireless signal transmitter tag to obtain at least one target identity information, wherein the at least one target identity information represents at least one target wireless signal transmitter; the cloud server obtaining an association between the message content and the at least one target identify information; and a second portable device comparing a second identity information with the at least one target identity information after the second portable device receives the second identity information, and receiving, by the second portable device, the message content from the cloud server.

In an embodiment, the message tag may include at least one of a time tag and a spatial tag, wherein the time tag includes at least one of a specific date, days of a week, and time. In another embodiment, the spatial tag includes a least one of a description of geographical coordinates, the floor or region of a store, the type of a store, and a description of a store.

In another embodiment, the message transmission method further includes, when the message content further includes Chinese text, performing text segmentation on the message content to determine word content therein. In yet another embodiment, when determining the word content, the message transmission method further includes analyzing the word content and the wireless signal transmitter tag to determine the spatial tag.

In yet another embodiment, the time tag entails a period in which the message content is valid, and the at least one target wireless signal transmitter includes any wireless signal transmitter within a distance range satisfying the time tag.

In still another embodiment, obtaining an association between the message content and the at least one target identity information further includes storing the association in an association table of the cloud server. Furthermore, the association between the message content and the at least one target identity information is periodically updated.

Compared to the prior art, the present invention discloses a message transmission method. When receiving an identity information of the first wireless signal transmitter, a first portable device transmits the identity information and a message content to a cloud server. The cloud server analyzes the message content to obtain a message tag of the message content, and obtain a wireless signal transmitter tag of the first wireless signal transmitter according to the identity information. The cloud server then obtains at least one target identity information representing at least one target wireless signal transmitter by analyzing the message tag and the wireless signal transmitter tag. The cloud server then associates the message content with the at least one target identity information and stores the association. Under this scenario, when receiving a second identity information, a second portable device compares the second identity information with the at least one target identity information, and receives the message content from the cloud server for subsequent use if the two second identity information matches the at least one target identity information.

DETAILED DESCRIPTION OF THE EMBODIMENTS

The technical content of present invention is described by the following specific embodiments. One of ordinary skill in the art can readily understand the advantages and effects of the present invention upon reading the disclosure of this specification. The present disclosure may also be practiced or applied with other different implementations. Based on different contexts and applications, the various details in this specification can be modified and changed without departing from the spirit of the present disclosure.

A message transmission method of the present invention is applicable to small wireless signal transmitters, and allows more accurately delineation of a message delivering range under small signal coverage, such that portable devices within that signal coverage can receive a specific message, and dynamically decides the message delivering range by analyzing the relationship between the message content and the wireless signal transmitters, thereby increasing the suitability of a message notification location-wise and time-wise.

Figure 1:
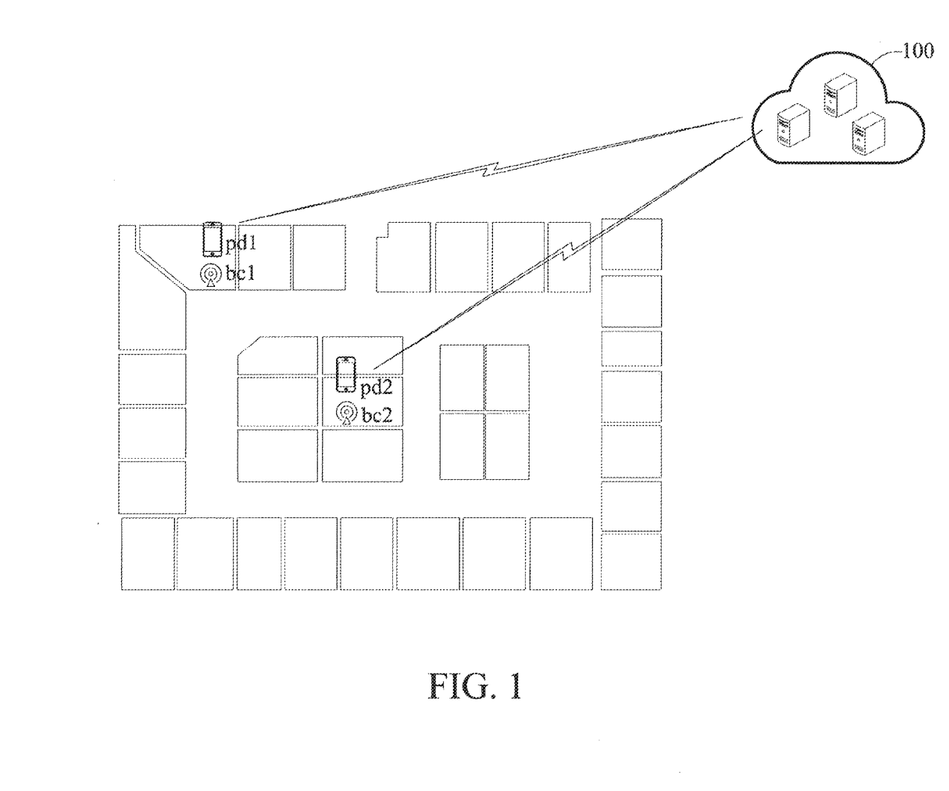
FIG. 1 is a schematic diagram depicting a scheme using a message transmission method in accordance with the present invention.

Referring to FIG. 1, a schematic diagram depicting a scheme using a message transmission method in accordance with the present invention is shown. As can be seen, according to an application scenario of the present invention, first and second wireless signal transmitters bc1 and bc2 are provided, and each of them may further be a beacon that communicates with the outside world via Bluetooth 4.0. In addition, there are first and second portable devices pd1 and pd2 in proximity to the first and second wireless signal transmitters bc1 and bc2, respectively. The first and second portable devices pd1 and pd2 may further be smartphones that can obtain identity information (e.g., information such as the universal unique identifier (UUID), Major, Minor values) of the beacons via Bluetooth 4.0. The first and second portable devices pd1 and pd2 are capable of connecting to a cloud via Internet connection. The cloud includes at least a cloud server 100 for receiving messages and the identity information of the beacons from the first and second portable devices pd1 and pd2.

Figure 2:
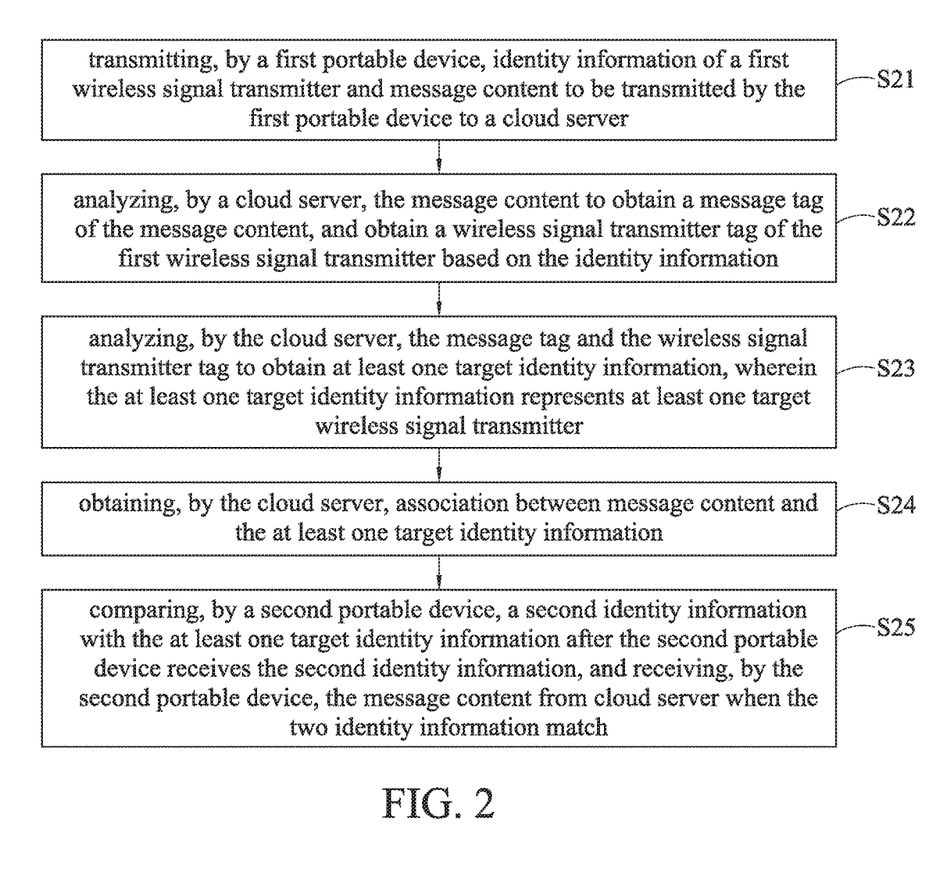
FIG. 2 is a flowchart illustrating the message transmission method in accordance with the present invention.

FIG. 2 is a flowchart illustrating the message transmission method in accordance with the present invention. The following descriptions refer to FIG. 1 in conjunction with FIG. 2. In step S21, a first portable device transmits identity information of a first wireless signal transmitter and a desired message content to be transmitted by the first portable device to a cloud server. Step S21 includes the first portable device pd1 receiving the identity information of the first wireless signal transmitter bc1, for example, UUID, Major and Minor parameters. The first portable device pd1 may obtain identity of each wireless signal transmitter via a wireless communication protocol, and then transmit the identity information of the first wireless signal transmitter bc1 and the message content to be delivered to users to the cloud server 100.

In step S22, the cloud server analyzes the message content to obtain a message tag of the message content, and obtain a wireless signal transmitter tag of the first wireless signal transmitter based on the identity information. In step S22, the cloud server 100 analyzes the message content to obtain a message tag. The message tag includes, for example, tags of time and spatial information.

In an embodiment, the message tag includes a time tag and a spatial tag. The time tag may record a specific date, days of a week, time, etc. The spatial tag may include a description of the geographical coordinates, the floor or region of a store, the type of the store, a description of the store, etc.

In addition, in the case that the spatial tag includes that when the message content is Chinese, text segmentation is performed on the message content to determine the word content in the message content. Once the word content is determined, it is analyzed along with the wireless signal transmitter tag in order to determine the spatial tag.

In an embodiment, after the message content is analyzed, a spatial tag is obtained. If the message content includes Chinese characters, then text segmentation is first performed to obtain each word. If the message content is not Chinese, then every word can be obtained without text segmentation. After candidate words for the spatial tag are obtained, they are further analyzed with the wireless signal transmitter tag (e.g., its spatial tag) in order to determine the spatial tag of the message content.

In step S23, the cloud server analyzes the message tag and the wireless signal transmitter tag to obtain at least one target identity information, wherein the at least one target identity information represents at least one target wireless signal transmitter. In step S23, the cloud server 100 looks up the wireless signal transmitter tag (e.g., time and spatial tags) of the first wireless signal transmitter bc1 based on the identity information of the first wireless signal transmitter bc1. The at least one target identity information is then obtained by comprehensively analyzing the message tag, the wireless signal transmitter tag of the first wireless signal transmitter bc1, and other wireless signal transmitter tag. Each target identity information represents one target wireless signal transmitter.

In an embodiment, the tag (time/space) of a wireless signal transmitter is obtained based on its identity. Next, the time/spatial tags of the message content and the wireless signal transmitter are analyzed in real time to obtain time/spatial search conditions. The time/spatial search conditions are then used to find a suitable wireless signal transmitter. In other words, it is determined whether the time tag of a wireless signal transmitter found by comparison matches with the current time; if not, the time tag is deleted.

In step S24, the cloud server obtains an association between the message content and the at least one target identity information. In an embodiment, the cloud server 100 stores message content to be delivered to users. The cloud server 100 associates the message content with the target identity information of the target wireless signal transmitter and stores it in an association table therein, wherein the association table (or the association between a message content and at least one target identity information) is periodically updated.

In step S25, after a second portable device receives a second identity information, the second identity information is compared with the at least one target identity information. When the two match, the second portable device then receives the message content from the cloud server. In step S25, the second portable device pd2 receives the identity information of the second wireless signal transmitter bc2, and the identity information is compared with the target identity information of each target wireless signal transmitter to determine whether the second wireless signal transmitter bc2 is the target beacon. If the second wireless signal transmitter bc2 is the target beacon, then the second portable device pd2 receives the message content originally transmitted to the cloud server by the first portable device pd1.

In an embodiment, when the second portable device pd2 is at a place capable of receiving a signal from a wireless signal transmitter, it can connect to the cloud server 100 and upload the identity information of this wireless signal transmitter, so that the cloud server 100 verifies the identity information of the wireless signal transmitter. If the two match, then the corresponding message content is transmitted to the second portable device pd2.

In addition, the time tag entails a period in which the message is valid. Accordingly, the at least one target wireless signal transmitter includes all signal transmitters within a distance range that satisfies the time tag. Since time is a required parameter during analysis, the same time/spatial tags of the message content and the wireless signal transmitter may result in different time/spatial search conditions. The time tag carried by the message content specifies a valid period, which will consequently affect the time/spatial search condition obtained from subsequent analysis. For example, a 1-hour limited sale in a store will be sent to all users that can get to the store within one hour at the start. After half an hour has elapsed, the message should only be sent to users that can arrive at the store in half an hour. It would be meaningless to send this message to users who are unable to arrive in time.

In determining whether a user is able to arrive at a store in time, distance may also be used for estimation along with historical statistical data. For example, on weekends, there are more people, and the pace will be slower, this will affects the range within which users can arrive at a store in time. In addition, the spatial tag of a wireless signal transmitter can be, for example, a description of geographical coordinates, the floor and region of a store, the type of a store, or a description of a store, as long as it provides space-related search conditions.

Figure 3A:
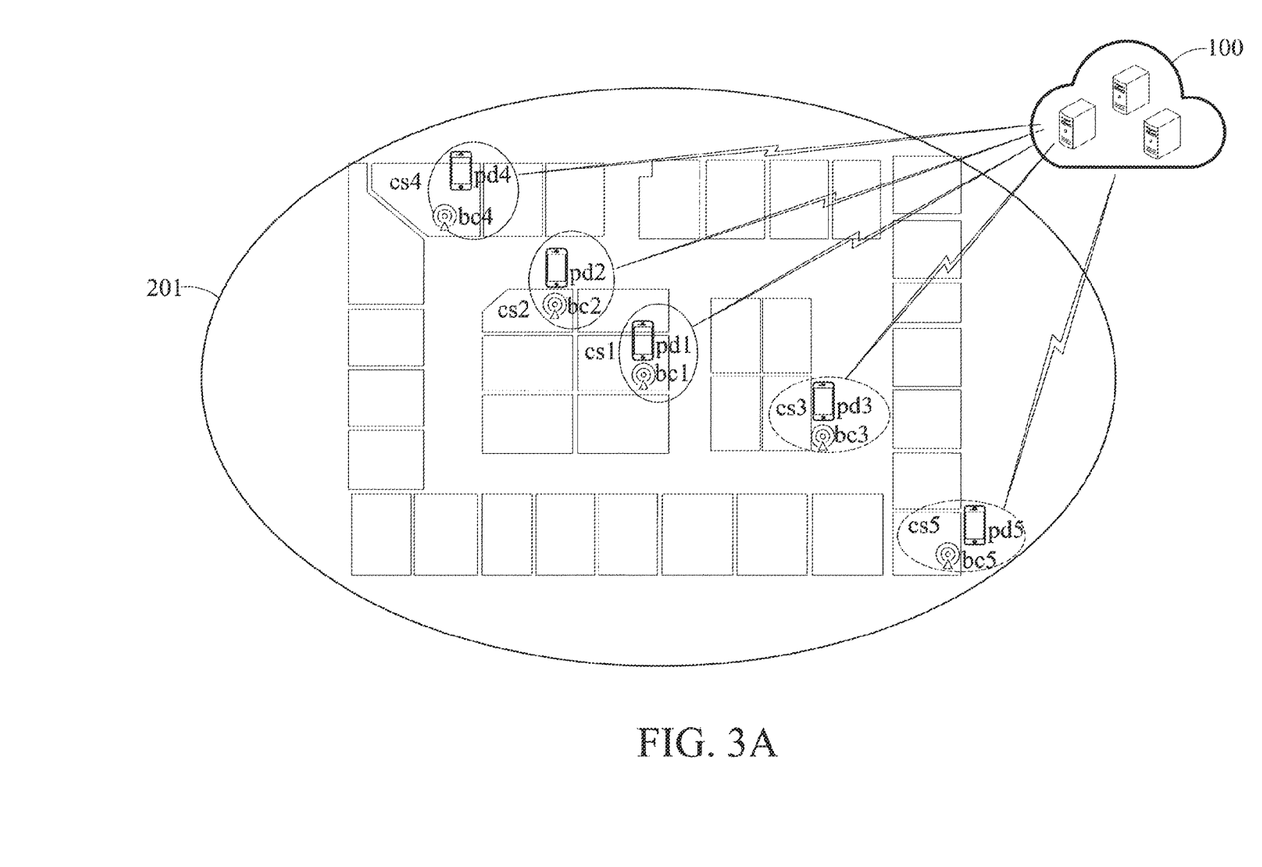
FIGS. 3A and 3B are schematic diagrams depicting scenarios in accordance with a first embodiment of the message transmission method of the present invention.
Figure 3B:
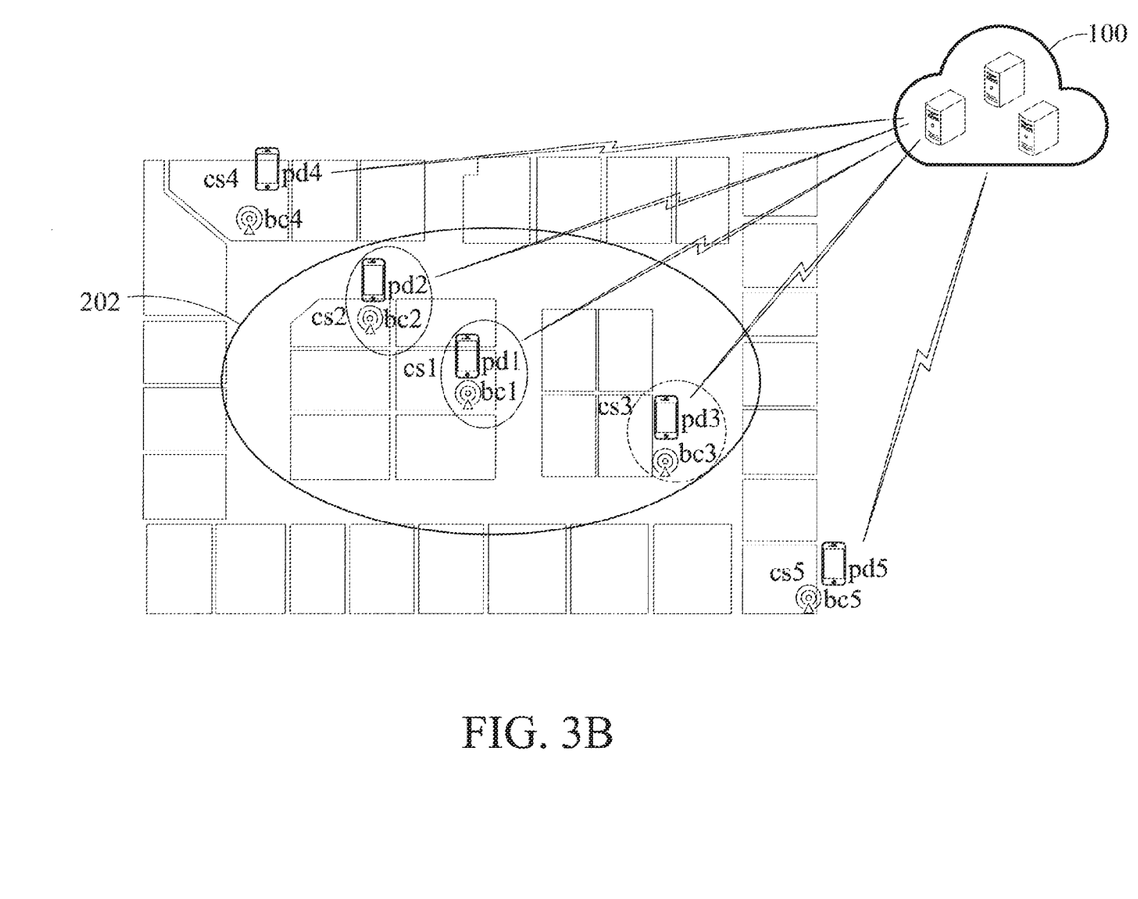

Referring to FIGS. 3A and 3B, schematic diagrams depicting scenarios in accordance with a first embodiment of the message transmission method of the present invention are shown. FIGS. 3A and 3B depict scenarios and beacon arrangement of the first embodiment. Stores cs1-cs5 indicate five stores, wherein cs1, cs2, and cs4 are sports stores, for example, type 1 (sports), whereas stores cs3 and cs3 are catering stores, for example, type 2 (catering). In addition, in terms of spatial distance, walking from store cs2 to store cs1 would take 30 minutes; walking from store cs3 to store cs1 would take 30 minutes; walking from store cs4 to store cs1 would take 1 hours; walking from store cs5 to store cs1 would take 1 hour. Five wireless signal transmitters bc1-bc5 are installed at stores cs1-cs5, respectively. Store cs1 is provided with a laptop computer that receives signals from the wireless signal transmitter bc1 via Bluetooth 4.0, and portable devices pd1-pd5 can be connected with the cloud server 100 and communication data therewith.

As shown in FIG. 3A, at 11:00 AM, a storekeeper at store cs1 enters a message ms1 with the content "Limited Sale 11:00 AM-12:00 AM. All Items 50% Off" via a user interface on the laptop computer. The laptop computer searches and finds the nearest wireless signal transmitter bc1 and obtains the identity information of the wireless signal transmitter bc1. Then, the laptop computer transmits the message content ms1 and the identity information of the wireless signal transmitter bc1 to the cloud server 100.

The cloud server 100 first analyzes the message content ms1 to obtain its (time) tag, i.e., "11:00 AM-12:00 AM", and then obtains the tag of the wireless signal transmitter bc1 based on the identity information of the wireless signal transmitter bc1, including type 1 (sports). Next, a geographical range within which users can arrive at store cs1 within an hour, i.e., before 12:00 AM as indicated by the geographical range 201 is calculated. In this geographical range 201, there are wireless signal transmitters bc1, bc2, bc3, bc4 and bc5. Then, more suitable targets are selected based on the tag (type 1) of the wireless signal transmitter bc1, in other words, bc1, bc2, and bc4, since these also have type-1 tags (sports).

Since the message content contains a time tag, the destined targets may change with time. As shown in FIG. 3B, at 11:30 AM, a geographical range within which users can arrive at store cs1 within 30 minutes, i.e., before 12:00 AM as indicated by the geographical range 202 is calculated. In this geographical range 202, there are wireless signal transmitters bc1, bc2, and bc3. Then, more suitable targets are selected based on the tag (type 1) of the wireless signal transmitter bc1. In other words, bc1 and bc2 are selected since these also have type-1 tags (sports). As a result, at 11:30 AM, the portable devices pd1 and pd2 are within the ranges of the wireless signal transmitter bc1 or bc2 capable of receiving signals, they can connect to the cloud server 100 and upload the respective identity information obtained. The cloud server 100 then verifies the identity information of the wireless signal transmitters. Finally, corresponding message content ms1 are sent to the portable devices pd1 and pd2.

Figure 4:
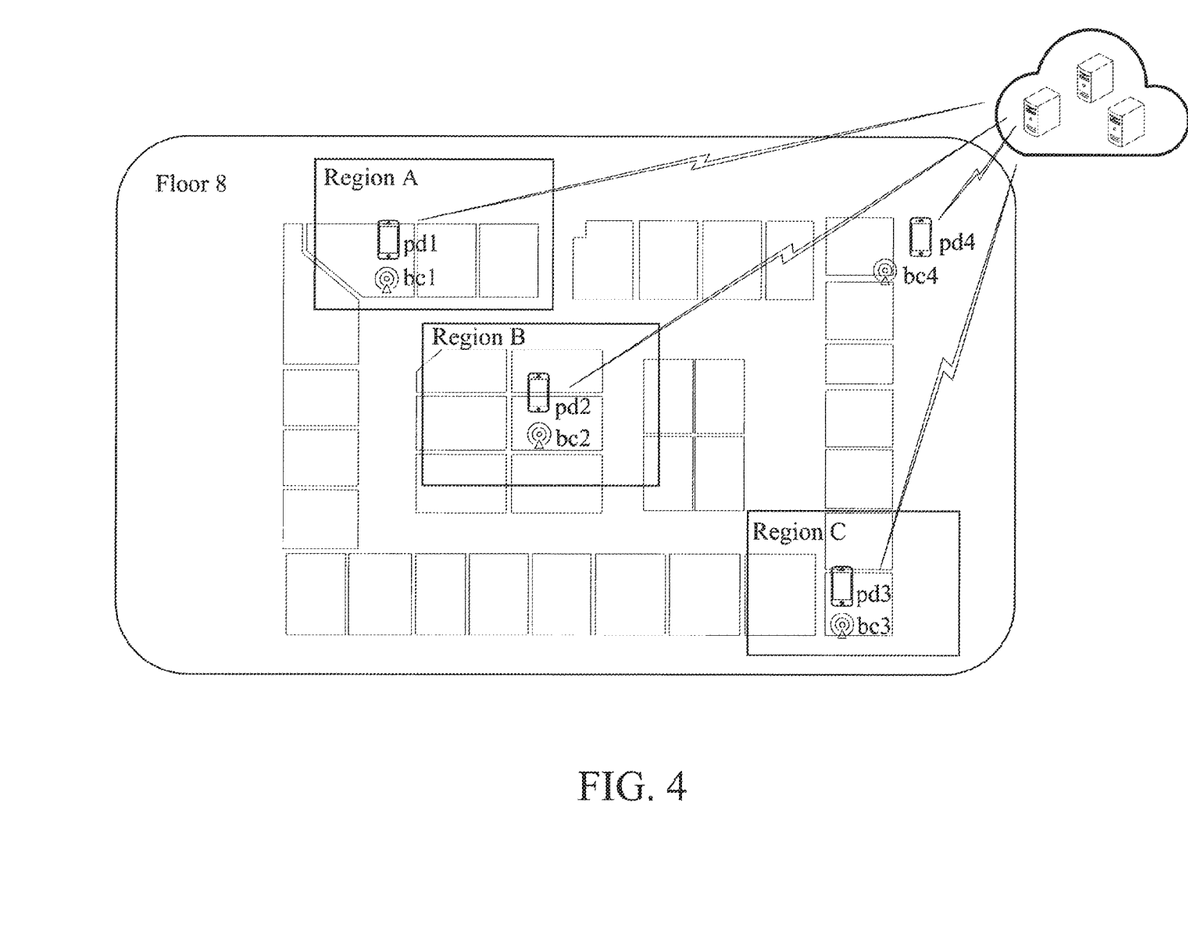
FIG. 4 is a schematic diagram depicting a scenario in accordance with a second embodiment of the message transmission method of the present invention.

Referring to FIG. 4, a schematic diagram depicting a scenario in accordance with a second embodiment of the message transmission method of the present invention is shown. As can be seen, on the $8^{th}$ floor there are three regions A, B and C. Wireless signal transmitters are installed at regions A, B and C, respectively. Wireless signal transmitter bc1 is given a tag "Floor 8/Region A"; wireless signal transmitter bc2 is given a tag "Floor 8/Region B"; wireless signal transmitter bc3 is given a tag "Floor 8/Region C"; and a wireless signal transmitter bc4 is given a tag "Floor 8." Portable devices pd1-pd4 are located in proximity to wireless signal transmitters bc1-bc4, respectively.

In implementation of this embodiment, a user uploads a message content ms2 via portable device pd4. The message content ms2 reads "Get 100 when you buy 1000 in stores on the $8^{th}$ floor." The portable device pd4 searches and finds the nearest wireless signal transmitter bc4 and obtains the identity information of the wireless signal transmitter bc4. Then, the portable device pd4 transmits the message content ms2 and the identity information of the wireless signal transmitter bc4 to the cloud server 100.

The cloud server 100 first analyzes the message content ms2 to obtain its (spatial) tag, i.e., "$8^{th}$ floor" in the message content ms2, then obtains a (spatial) tag (i.e., "Floor 8" of the wireless signal transmitter bc4 based on its identity information, and determines that the destined targets for the message content ms2 should be wireless signal transmitters bc1, bc2, bc3 and bc4, since they all have the same spatial tags as that of the message content ms2. When being in signal receiving ranges of the wireless signal transmitter bc1, bc2, and bc3, the portable devices pd1, pd2 and pd3 can connect to the cloud server 100 and upload the identity information of the respective wireless signal transmitter. The cloud server 100 then verifies the identity information of the wireless signal transmitters, and finally transmits the corresponding message content ms2 to the portable devices pd1, pd2 and pd3.

Figure 5:
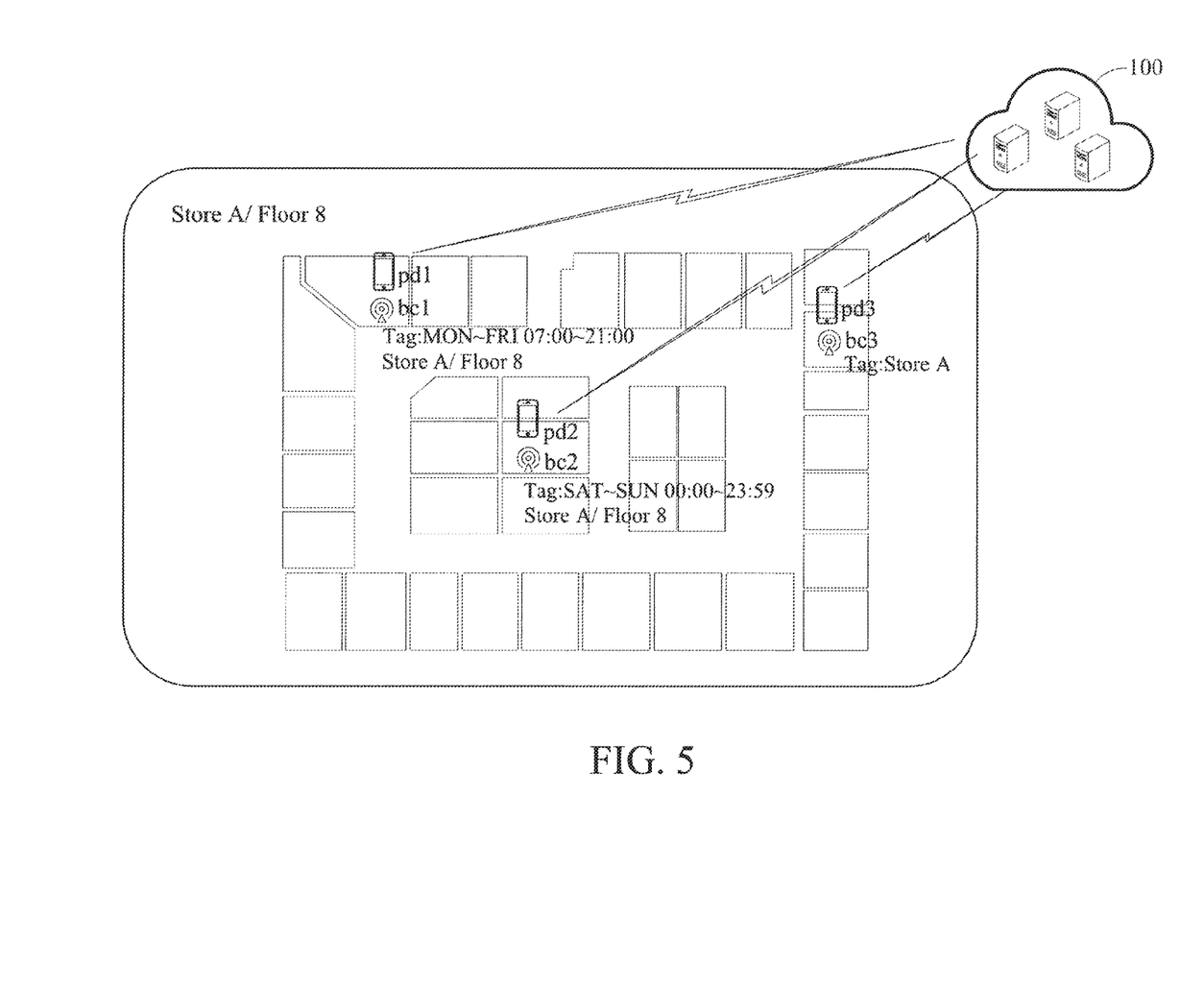
FIG. 5 is a schematic diagram depicting a scenario in accordance with a third embodiment of the message transmission method of the present invention.

Referring to FIG. 5, a schematic diagram depicting a scenario in accordance with a third embodiment of the message transmission method of the present invention is shown. As can be seen, on the 8$^{th}$ floor there are wireless signal transmitters bc1-bc3, wherein the wireless signal transmitter bc1 is given a (time/spatial) tag "MON-FRI 07:00-21:00/Store A/Floor 8"; wireless signal transmitter bc2 is given a (time/spatial) tag "SAT-SUN 00:00-23:59/ Store A/Floor 8"; and wireless signal transmitter bc3 is given a (spatial) tag "Store A." Portable devices pd1-pd3 are located in proximity to wireless signal transmitters bc1-bc3, respectively.

In implementation of this embodiment, a user uploads a message content ms3 via portable device pd3. The message content ms3 reads "8/1-8/8 Anniversary Sale." The portable device pd3 searches and finds the nearest wireless signal transmitter bc3 and obtains the identity information of the wireless signal transmitter bc3. Then, the portable device pd3 transmits the message content ms3 and the identity information of the wireless signal transmitter bc3 to the cloud server 100.

The cloud server 100 first analyzes the message content ms3 to obtain its (time) tag, i.e., "8/1-8/8" in the message content ms2, then obtains a (spatial) tag (i.e., "Store A" of the wireless signal transmitter bc3 based on its identity information, and determines after analysis that the destined targets for the message content ms3 should be wireless signal transmitters bc1, bc2, and bc3, since they all have the same (spatial) tags as that of the message content ms3. However, the wireless signal transmitter bc1 and bc2 have different (time) tags, assuming it is currently 8/8 SUN 08:00 PM, and then only the wireless signal transmitter bc2 satisfies all (time/spatial) tags. When being in signal receiving range of the wireless signal transmitter bc2, the portable devices pd2 can connect to the cloud server 100 and upload the identity information of the wireless signal transmitter. The cloud server 100 then verifies the identity information of the wireless signal transmitter, and finally transmits the corresponding message content ms3 to the portable device pd2.

In conclusion, the message transmission method according to the present invention allows a user of a portable device to identify its current location and receive proximity-based messages using surrounding wireless signal transmitters. By analyzing message content and the tags of the wireless signal transmitters, a message transmission range suited for a particular time/space, thereby increasing the effectiveness of the message. In addition, messages are not transmitted to the portable devices via the wireless signal transmitters, so the wireless signal transmitters require no network connectivity, thereby reducing the setup cost of the wireless signal transmitters. In actual operations, the wireless signal transmitters are lightweight and simple signal transmission devices, signal coverage, setup location and density can be modified to determine a promotion or notification range, allowing flexibly planning of the signal notification range.

The above embodiments are only used to illustrate the principles of the present invention, and should not be construed as to limit the present invention in any way. The above embodiments can be modified by those with ordinary skill in the art without departing from the scope of the present invention as defined in the following appended claims.

What is claimed is:

1. A message transmission method, comprising:
transmitting, by a first portable device, an identity information of a first wireless signal transmitter and a message content of the first portable device to a cloud server;
analyzing, by the cloud server, the message content to obtain a message tag of the message content and obtain a wireless signal transmitter tag of the first wireless signal transmitter based on the identity information;
analyzing, by the cloud server, the message tag and the wireless signal transmitter tag to obtain at least one target identity information, wherein the at least one target identity information represents at least one target wireless signal transmitter, and the wireless signal transmitter tag includes a transmitter time tag or a transmitter spatial tag, and the transmitter time tag and the transmitter spatial tag is served as a filtering basis for the cloud server to filter the at least one target wireless signal transmitter, wherein the transmitter spatial tag includes the type of a store;
obtaining, by the cloud server, an association between the message content and the at least one target identify information; and
comparing, by a second portable device, a second identity information with the at least one target identity information after the second portable device receives the second identity information, and receiving, by the second portable device, the message content from the cloud server.

2. The message transmission method of claim 1, wherein the message tag includes at least one of a time tag and a spatial tag.

3. The message transmission method of claim 2, wherein the time tag includes at least one of a specific date, days of a week, and time.

4. The message transmission method of claim 2, further comprising, when the message content is Chinese text, performing text segmentation on the message content to determine word content therein.

5. The message transmission method of claim 4, further comprising analyzing the word content and the wireless signal transmitter tag to determine the spatial tag.

6. The message transmission method of claim 2, wherein time tag entails a period in which the message content is valid.

7. The message transmission method of claim 6, wherein the at least one target wireless signal transmitter includes any wireless signal transmitter within a distance range satisfying the time tag.

8. The message transmission method of claim 2, wherein the spatial tag includes at least one of a description of geographical coordinates, a floor or region of a store, a type of a store, and a description of a store.

9. The message transmission method of claim 1, wherein obtaining the association between the message content and the at least one target identity information further includes storing the association in an association table of the cloud server.

10. The message transmission method of claim 9, wherein the association between the message content and the at least one target identity information is periodically updated in the association table.

* * * * *